United States Patent [19]

Bottasso et al.

[11] 4,151,038

[45] Apr. 24, 1979

[54] APPARATUS FOR JOINING THE ENDS OF FABRIC STRIPS

[75] Inventors: Franco Bottasso; Silvio Manini, both of Milan, Italy

[73] Assignee: Industrie Pirelli, S.p.A., Milan, Italy

[21] Appl. No.: 796,592

[22] Filed: May 13, 1977

[30] Foreign Application Priority Data

Jun. 28, 1976 [IT] Italy .............................. 24791 A/76

[51] Int. Cl.² .......................................... G03D 15/04
[52] U.S. Cl. .............................. 156/507; 156/405 P; 156/502; 156/558; 156/580; 226/15; 226/19; 271/3.1; 271/184; 271/225; 271/226
[58] Field of Search ............... 156/157, 159, 266, 204, 156/405 P, 406, 507, 558, 502, 361, 580; 38/100; 226/18, 19, 195; 271/3.1, 225, 184, 19, 226

[56] References Cited

U.S. PATENT DOCUMENTS

| 2,702,579 | 2/1955 | Perry | 156/366 |
|---|---|---|---|
| 2,832,396 | 4/1958 | Harris | 156/406 |
| 3,100,731 | 8/1963 | Brey | 156/157 |
| 3,192,094 | 6/1965 | Phillips et al. | 156/353 |
| 3,243,978 | 4/1966 | Gowin | 226/15 |
| 3,253,489 | 5/1966 | Phillips | 83/88 |
| 3,769,136 | 10/1973 | Ospelt | 156/157 |
| 3,850,778 | 11/1974 | Gnage | 156/159 |
| 3,854,357 | 12/1974 | Kron | 156/502 |
| 3,888,717 | 6/1975 | Koyama et al. | 156/159 |
| 4,025,384 | 5/1977 | Shiozaki et al. | 156/502 |

Primary Examiner—Jerome W. Massie
Attorney, Agent, or Firm—Stevens, Davis, Miller & Mosher

[57] ABSTRACT

A process and apparatus are provided for joining overlapping fore and rear ends of two pieces of deformable material which are placed in overlapping relationship through the conjunctive use of a first fixed support surface supporting a protruding rear edge of one of the pieces of material and a second rotative support surface supporting a non-protruding fore edge of the second piece of material. Each support surface is provided with associated devices for shifting an associated support edge of material to create small waves of material near the edges of the first and second pieces of material. The shifted pieces of material are overlapped by rotating the second support surface into substantial alignment with the first support surface thereby bringing the fore edge of the second piece under and in contact with the rear protruding edge of the first piece. A pressing device joins the overlapped edges of the two pieces of material by pressing them against the second support surface.

14 Claims, 14 Drawing Figures

APPARATUS FOR JOINING THE ENDS OF FABRIC STRIPS

The present invention relates to a process and apparatus for joining overlapping portions of longitudinally arranged pieces or bands of a deformable material. More particularly, the invention relates to a process and apparatus for joining the rear and fore ends of a number of such material pieces, especially of cord fabrics. The various process steps can be carried out without any manual intervention and in a wholly automatic manner, using the apparatus of the invention.

As it is known, in many fields of industry, especially in tire manufacture, semi-finished products in the form of bands of cords are used. These bands are obtained by joining the ends of pieces of deformable material.

Cord bands are used for tire manufacture in which the cords are parallel to each other and form a pre-set angle (other than 0°) with the longitudinal axis of each band, which angle, for radial type tire is 90°. Such bands are obtained by the joining of the opposite ends of the pieces of such cord fabrics, each of them is in turn obtained by cutting it from another band whose cords are on the contrary substantially oriented according to the longitudinal axis of the band.

In case of fabrics with textile cords the joints between the pieces are of the overlapping type, that is, in which the joint between the rear end of one piece and the fore end of another piece is obtained by overlapping the edges of a desired length and pressing them at a pre-determined pressure, sufficient, however, for firmly adhering them to each other. Therefore, in coincidence with the joint area there are two piece portions contacting each other.

For joining pieces of the type hereinbefore described, the fore edge of a pre-set length of a piece is overlapped onto the rear edge of a band obtained by joining together a number of pieces and bringing to bear on the joint thus obtained, while being laid on an appropriate supporting surface, suitable pressures generated by a tool which is made to slide on the joint. These steps are manually carried out by means of a few tools.

It is apparent that the manufacturing cost of bands of the type described is high due to the continuous necessary manual operations and joints thus obtained are some times imperfect, as their characteristics depend on the skill of the operator who has carried out the various necessary steps for obtaining the joints.

An object of the present invention is to provide a process for successively joining in a wholly automatic manner overlapping portions of the rear end of a band of a deformable material obtained by joining a number of pieces of the material and between the fore end of a piece of the same material.

This process is characterized in that it comprises at least the following steps: the laying of an end portion of said band on a first supporting surface, in a manner that the rear edge of said bands slightly protrudes with respect to the corresponding edge of the supporting surface; the advancing of each piece on a second supporting surface and towards the first supporting surface at least until the fore edge of the piece is brought into coincidence with the relative edge of the second supporting surface, where the relative position of the second supporting surface to the first one is such that the edge of the second surface is substantially below the edge of the first surface; the shifting of the second supporting surface with respect to the first one, in a manner that the fore edge of the piece is below the band protruding portion, for creating with the fore edge and with the protruding portion an overlapping portion, and bringing to bear onto the overlapping portions a preset pressure for locking with each other the fore edge and the protruding portion.

Advantageously the shifting of the second supporting surface consists in substantially rotating it around an axis perpendicular to the advancing direction of the piece on the surface, and the piece is made to advance onto the second supporting surface until the fore edge of the piece protrudes by a pre-set amount with respect to the corresponding edge of the surface.

Further, the process according to the present invention comprises a step which consists in exactly spacing by a pre-set amount, the rear edge of the band from the corresponding edge of the first supporting surface, and the fore edge of the piece from the corresponding edge of the second supporting surface, and in arranging the edges of the band and of the piece into a parallel position, where the phase comprises the steps for bringing a supporting surface into contact with each one of the edges and shifting the surface towards the edge of the relative supporting surface, in a manner that the edge of both the piece and the band are brought to pre-set and controlled distances from edges of the relative supporting surface, thus forming in the piece and in the band an abundance wave lying on the relative supporting surface.

It is a further object of the present invention to provide an apparatus adapted for practicing the process, characterized in that it comprises at least a first fixed supporting surface, suitable for receiving a terminal portion of the band, means advancing the band on the first supporting surface, means for stopping its advancement when the rear edge of the band slightly protrudes with respect to the corresponding edge of the supporting surface, a second mobile supporting surface adapted to receive each one of the pieces, means for making each piece advance on the second supporting surface, means for stopping the advancement when the fore edge of the piece is substantially in coincidence with relative edge of the second supporting surface, where the relative initial position of the second supporting surface with respect to the first one is such that the edge of the second surface is substantially below the edge of the first surface, means for shifting the second mobile supporting surface towards the first one, in a manner that the fore edge of the piece lying on it is brought under the band protruding portion, for overlapping the fore edge and the protruding portion, and means for bringing to bear onto the overlapping portions arranged on the second supporting surface pre-set pressures for locking the overlapping portions together.

For a better understanding of both the process and the apparatus of the present invention, the following description of the fundamental steps of the process and of the various mechanical units of the apparatus is with reference to the attached drawing in which.

Figure 2:
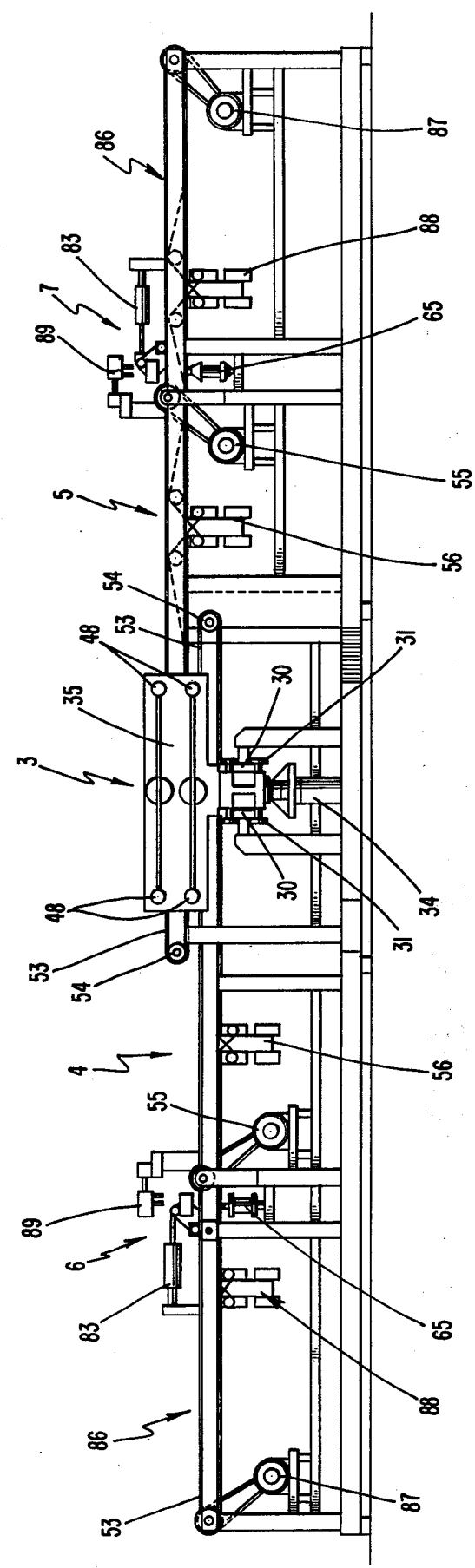
FIG. 2 shows another view of the apparatus perpendicular to the previous one.
Figure 3:
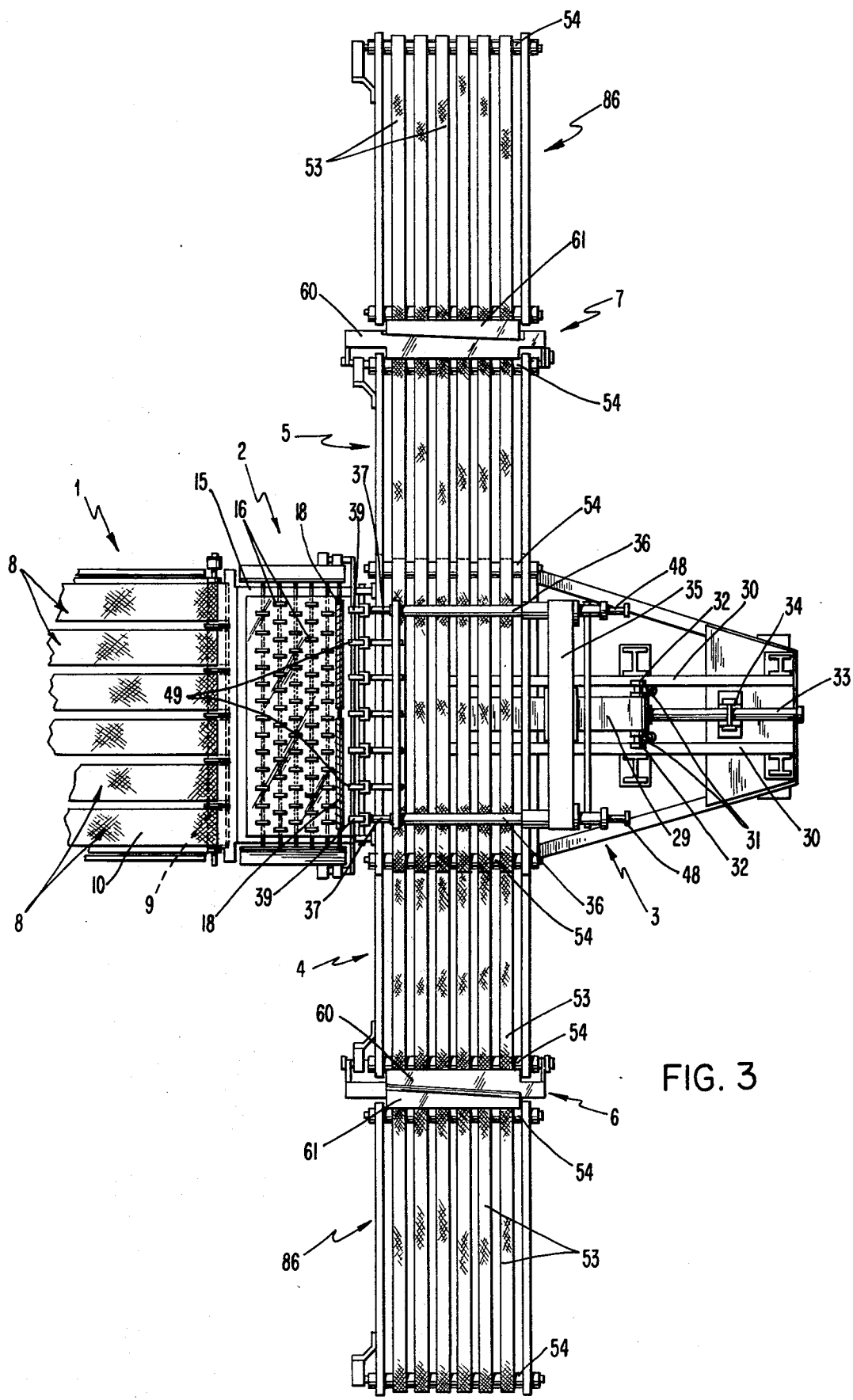
FIG. 3 shows a plan view of the apparatus.

Before describing the various process steps for joining together overlapping ends of a piece of cord fabric according to the present invention, an apparatus which is suitable for practicing the process will be described with reference to FIGS. 1, 2 and 3 of the drawing, in which mechanical units connected to each other are illustrated.

Such equipment substantially comprises a feeding table 1, suitable for transferring pieces of cord fabric from a charging station towards the apparatus, a positioning device 2, suitable for positioning the pieces of fabric in a desired arrangement, a conveying device 3, suitable for transferring the pieces from the positioning device to conveyors 4 and 5 and finally a pair of joining devices 6 and 7. Each of devices 6 and 7 is suitable for joining the overlapping ends of two continguous fabric pieces.

Feeding table 1 (FIGS. 1 and 3) substantially comprises a number of continuous bands 8, substantially parallel to each other, which are wound on end rollers 9 so that with their upper reaches 10 (FIG. 1) provide a surface on which cord fabric pieces (not shown) can be laid for being conveyed from a charging station 11 towards positioning device 2. These bands can be driven in any suitable manner such as by an electric motor 12 which rotates rollers 9 through an appropriate transmission. Appropriate stretchers 13 can be provided to maintain the bands in a taut condition on the rollers.

The cord fabric pieces laid on table 1 are preferably spaced from each other by a predetermined distance. For this purpose, the pieces can be fed to the charging station 11 by a band conveyor (not shown) onto which the pieces are laid after they have been cut. The bands 8 of table 1 are driven at a higher speed than the band conveyor. Pieces of fabric lying on the conveyor have edges which substantially contact each other. When one of these pieces arrives at station 11, it is pushed onto bands 8 with spacing a pre-determined distance from the next one.

Figure 5:
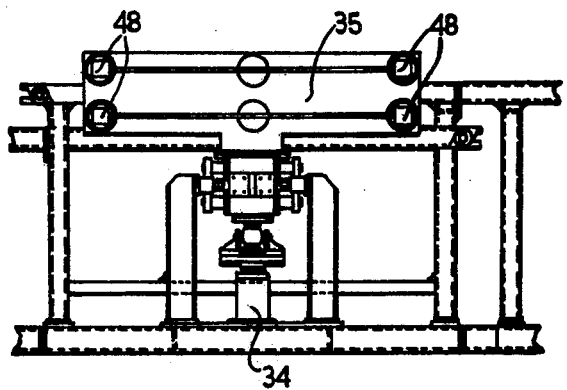
Figure 6:
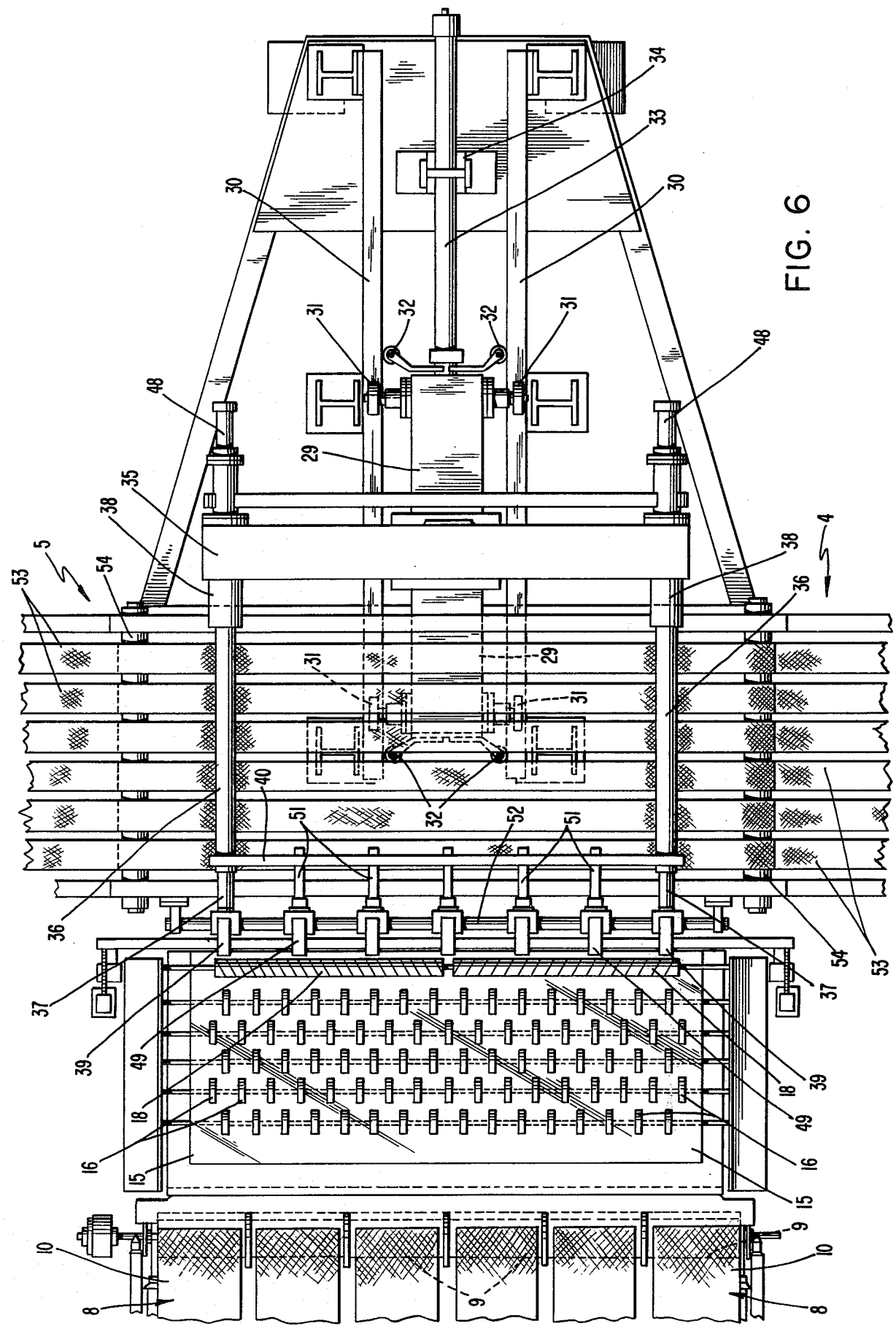

The positioning device 2 (FIGS. 4 to 6) substantially comprises a pair of supporting surfaces 15, for example, a metal plate, arranged at different heights (in FIG. 6 only the higher one is visible). Each one of them is suitable for supporting a fabric piece. A number of holes are provided in each plate and a supporting roller 16 protrudes through them. The external surface of the roller is suitable for contacting the lower surface of the fabric. As can be noted in FIG. 6, rollers 16 are arranged in several rows thereof and are spaced axially a small distance from each other so that a piece of fabric disposed above a supporting surface 15 lies on the surface of the rollers. The rollers 16 may be rotated in any convenient manner such as by fixing the rollers of each row on a single shaft which is driven through an appropriate transmission by an electric motor 17 (FIG. 4).

In coincidence with the edge of each supporting surface 15 which is towards the conveying device 3 (FIG. 3), other driving rollers 18 are arranged (FIG. 6).

These rollers are different from rollers 16 because they have a high axial length and are provided with a helicoidal projection on their peripheral surface which is suitable for contacting the lower surface of the fabric piece lying on the rollers. These rollers 18 are also rotated by motor 17 or any other convenient means.

Figure 1:
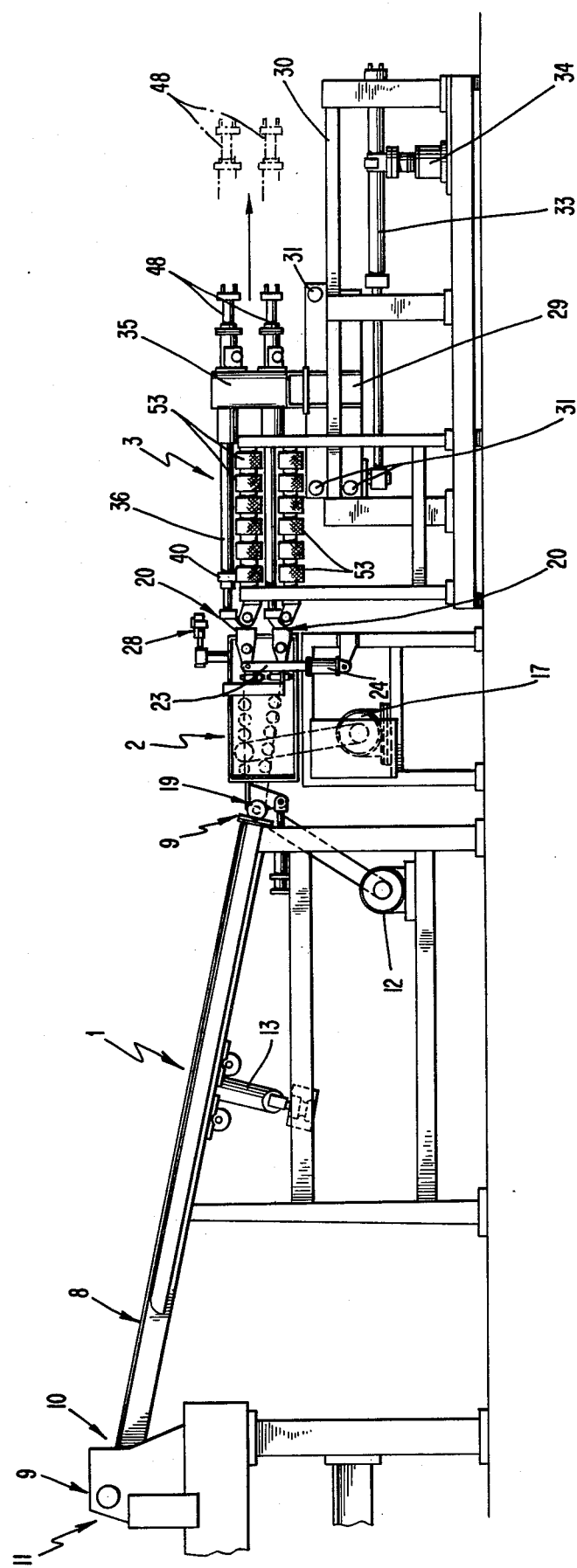
FIG. 1 shows a side view of the apparatus according to the invention.
Figure 4:
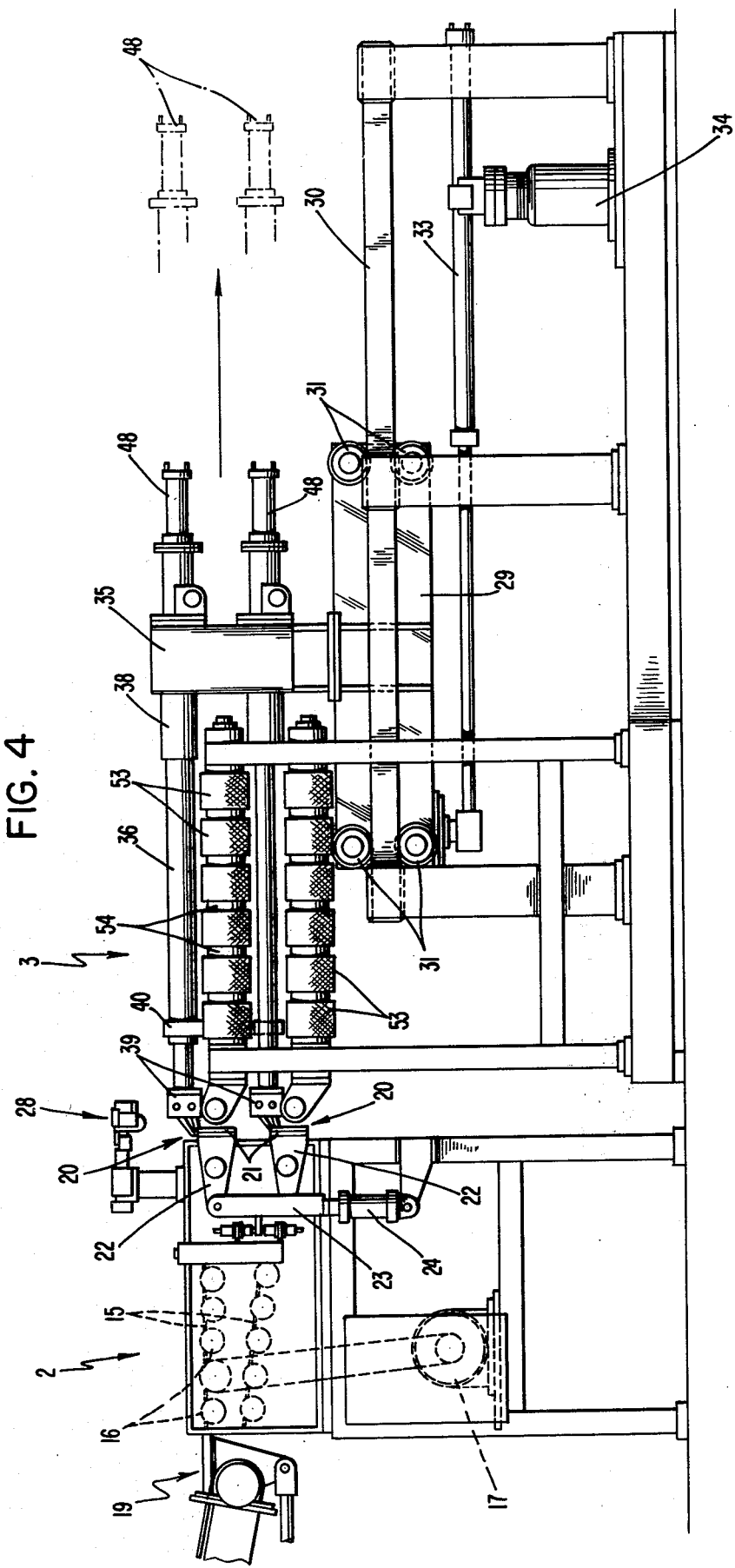
FIGS. 4, 5 and 6 show details in an enlarged scale the views of FIGS. 1, 2 and 3 respectively.

A deviating gear 19 is disposed between feeding table 1 and positioning device 2 (FIGS. 1 and 4). Deviating gear 19 comprises a plate which is rotated around an axis parallel to the corresponding edge of supporting surface 15, in two different positions for alternately guiding a fabric piece coming from feeding table 1 onto the highest surface 15 or onto the other one lying under the highest one. Positioning device 2 has a pair of stopping gears 20 (FIG. 4) each one of which comprises a plate 21 and fins 22 that are rotatable around an axis perpendicular to the surface of FIG. 4. The extremities of the fins, opposite to plate 21, are hinged on an actuation bar 23 which in turn is controlled by a fluid-dynamic cylinder 24. Each stopping gear can take two different positions, in one of which plate 21 is in a lower position than the corresponding supporting surface 15 and, therefore, of the fabric piece lying on it, and in the second position (as shown in FIG. 4), subsequent to actuation of cylinder 24, the plate is substantially at the same height as the surface, in a manner that it forms a stop for the edge of the fabric piece lying on it. Advantageously, a photo-cell controlling device 28 is provided for controlling the position of the edges of each piece against the plate 21 of stopping gears 20. Conveying device 3 has a mobile carriage (FIGS. 1 and 4) which moves in the motion direction of the motion of the fabric pieces on feeding table 1 and on guides 30 of the equipment frame. Device 3 is provided with a first set of castors 31 (FIG. 6) which cooperate with guides 30 to hinder shifting on a vertical plane. Device 3 also has a second set of castors 32 which cooperate with guides 30 to hinder movement in a direction perpendicular to the vertical plane. The motion of carriage 29 is controlled by a fluid-dynamic cylinder 33 (FIG. 4), whose casing is connected to a support 34 fixed with the frame. The carriage is provided with a cross member 35 (FIG. 6) to which, on two different planes, are connected two pairs of tubular elements 36. A piston rod 37 which is fixed to a piston (not shown) of a fluid-dynamic cylinder 38 slides in each of the tubular elements 36. A pliers carrying box 39 is fixed to one end of rod 37 (FIGS. 4 and 6).

Figure 9:
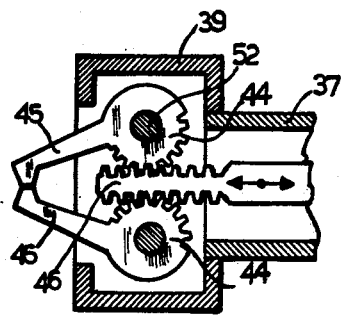
FIGS. 9 and 10 show schematical sections of boxes having pliers which are a part of the apparatus.
Figure 10:
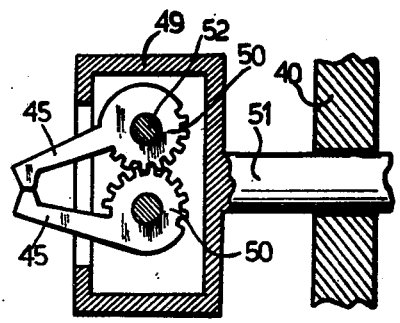

Tubular elements 36 of each pair, are connected to a second cross member 40. In the interior of each pliers carrying box 39 there is arranged a pair of gears 44 (FIG. 9) each one of which is fixed to an arm of pliers 45. Between the gears there is arranged a double rack, indicated with 46 which engages with each one of them and which is obtained from a bar which moves axially in the interior of an axial hole of relative piston rod 37 and which is actuated by a corresponding fluid-dynamic cylinder 48 which is also fixed to cross member 35. Additional pliers carrying boxes are arranged between boxes 39 and have the structure shown in FIG. 10. In each of these boxes, there is located a pair of gears 50 and a pliers arm 45 connected thereto. Such gears are coupled to each other and rotatable on box 49 which is connected to piston rod 51 which slides in a corresponding perforation of cross member 40 and is guided thereby.

Gears 44 and 50 which lie higher than boxes 39 and 49 are rigidly connected to each other through a bar 52 which oscillates around its own axis together with the gears in a manner that shall be explained.

Each supporting surface 15 of the positioning device 2 is aligned with the upper surface of conveyors 4 and 5 (FIGS. 2 and 4) in a manner so conveying device 3 can successively take up a pair of fabric pieces lying on surfaces 15 for conveying them at the same time onto the conveyors.

Each conveyor is formed by a number of continuous bands 53 (FIGS. 4 and 6) which wind up on extremity rollers 54. The motion of the bands is controlled by electric motors 55 (FIG. 2) and are put under traction in a known manner by stretchers 56. Bands 53 move perpendicularly to the movement of bands 8 of feeding table 1, whereas the direction of the motion of the upper reaches of each one is opposite to the one of the upper reaches of the other so that fabric pieces lying on the bands are conveyed towards the corresponding joining devices 6 and 7 (FIG. 3).

Each joining device has an oscillating plate 60 (FIGS. 7 and 8) which is rotatable around an axis 60a substantially parallel to the axes of rollers 54 and a fixed plate 61 which provides a supporting surface substantially aligned with upper reaches of bands 53. Plate 60 has at least one appendix 62 to which, in 63, is hinged a piston rod 64 of a fluid-dynamic cylinder 65 which cause an oscillating movement of the plate. Plate 60 is provided with a number of perforations 66 through which fins 67 pass. Fins 67 are fixed to a frame 68 which can shift horizontally due to the action of fluid dynamic cylinder 69. Cylinder 69 controls the movement of a piston rod 70 (FIG. 8) which is hinged on a handle 71 provided with a toothed pinion suitable to engage with a corresponding rack 72 which is solid with frame 68.

Figure 7:
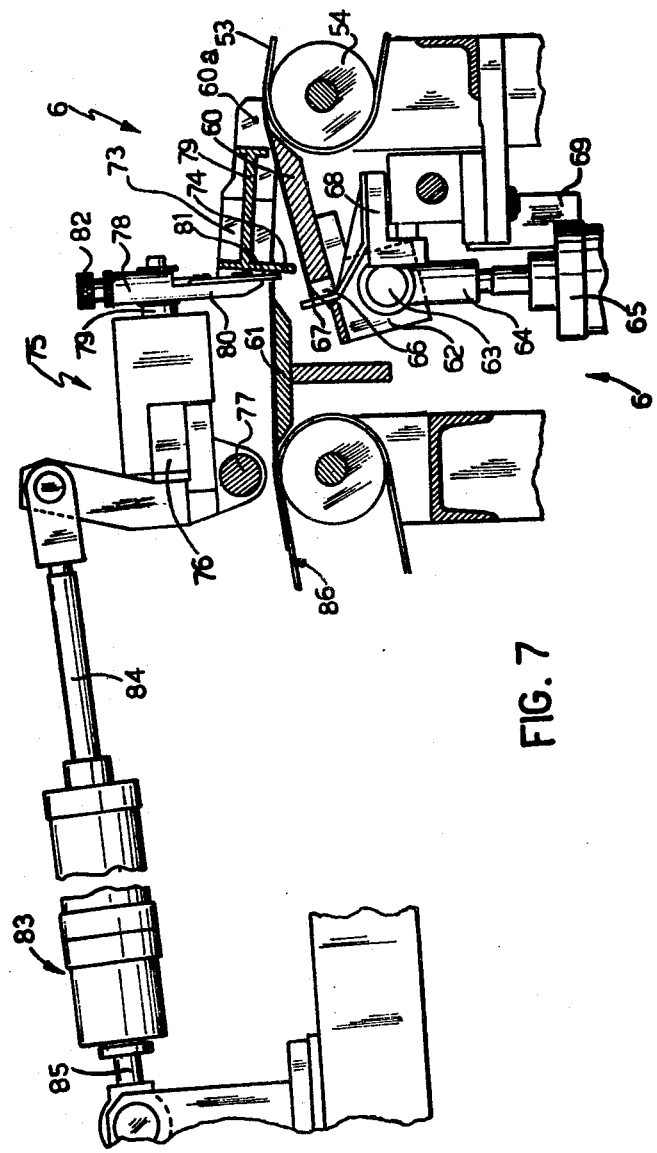
FIG. 7 shows a side, partially in section, of the actual joining device being part of the apparatus in a first operative position thereof.

An oscillating frame 73 is rotatable around the axis 60a and is provided with a thrust element 74 which contacts a fabric piece lying on the oscillating plate 60. Frame 73 is constantly rotated in a counter-clockwise direction as seen in FIG. 7 towards oscillating plate 60 due to the action of an elastic member (now shown).

The joining device also has a member 75 for applying pressure to the overlapping fabric edges. Member 75 has a frame 76 rotatable on a bar 77 and is provided with a slide member 78 sliding in a substantially horizontal direction to the frame. Member 78 is connected to a rod 79 of a fluid-dynamic cylinder carried by frame 76 and is provided with a member 80 which is brought into contact with the edges of the fabric pieces to be joined to apply a pre-set pressure. A stopping fin 81 protrudes with respect to the end edge of tool member 80 and is axially movable on it. The tool fin is kept in the position shown in FIG. 7 under the action of an elastic member (not shown), located in the interior of slide member 78. The elastic member can be simply formed by a pre-loaded spring capable of transmitting the pre-compression force to the stopping fin 81. Advantageously the force acting on a knob 82 can be varied through which the pre-compression force rise of the spring is varied. Rotation of frame 76 around the bar 77 is controlled by a fluid-dynamic cylinder 83 through piston rods 84 and 85 which are hinged on a projection of frame 76 and on the frame of the apparatus. The cylinder is double acting having two independent chambers in each one of which a piston can slide, one of which is connected with piston rod 84 and the other with piston rod 85. For reasons which shall be explained hereinafter, the axial length of the chambers is substantially different so the stroke of the pistons are different. An additional pair of conveyors 86 (FIGS. 2 and 3) is provided which comprise several continuous bands wound up on their corresponding rollers to advance the fabric piece bands which are fed by the joining devices towards the winding coils (not shown). The upper reaches of such bands are substantially aligned with fixed plates 61 and the bands are appropriately started by a motor 87 (FIG. 2) and put under tension by stretchers 88.

The process of the present invention can be practiced in the following manner using the described equipment.

Cord fabric pieces of a pre-determined length are fed onto the upper portions 10 (FIG. 1) of feeding table 1 making them arrive at station 11 in the already described manner (for instance, by a band conveyor) from which they are conveyed towards the positioning device 2. Each one of the pieces is cut from a cord band in which the cords are arranged in a longitudinal direction by cutting the cord band in a direction perpendicular to the cord lying direction and it is placed above feeding table 1 so that the cords are substantially aligned with the direction of movement of the bands. Conventional means, not shown, alternately actuate the deviating gear 19 (FIG. 1) to rotate successively in two positions for feeding a fabric piece on both supporting surfaces 15 of the positioning device 2. Each one of the fabric pieces is dragged by bands 8 on feeding table 1 in a manner that makes it cross the deviating gear and to be arranged above rollers 16 (FIG. 6) of positioning device 2 where the latter drag the fabric piece above the relative supporting surface 15. Such dragging goes on until the fore end of the fabric piece comes into contact with rollers 18 which are able to exert on it both a dragging action towards the conveying device 3 and a smoothing action of the fabric piece perpendicularly to the dragging direction so that the formation of any folds on the piece is avoided.

When a fabric piece moves on its relative supporting surface 15 of the positioning device 2 relative stopping gear 20 (FIG. 4) is in its lifted position so that plate 21 is substantially arranged along the way of the fabric piece. As shown in FIG. 4, the consequence thereof is that when its fore end comes into contact with the plate, the piece is stopped. In fact, the total dragging action of rollers 16 and 18 of the supporting surface is such that it drags the piece when the latter is completely free while the rollers become absolutely inactive and therefore there is a dragging between said rollers and the lower fabric piece surface when the fore edge of the latter is stopped by the plate of the stopping gear 20.

When on each supporting surface 15 of positioning device 2 a fabric piece is in contact with the relative stopping gear 20, the conveying device 3 is in the position shown in both FIGS. 1 and 4, that is, in which carriage 29 is in its travel end position towards the left in these figures while piston rods 37, which are sliding within tubular elements 36, are in their travel end position towards the right with respect to the carriage, and the arms of pliers 45 (FIGS. 9 and 10) are in an open position that is spaced apart.

As soon as both fore edges of the fabric piece are against plate 21 (FIG. 4) of stopping gear 20 due to actuation of cylinder 24, fins 22 rotate clockwise bringing the plate to the lowered position thereof. A photocell device 28 controls the position of the edges and, if this position is correct, it allows the actuation of conveying device 3 actuation means. First, the fluid-dynamic cylinders 38 (FIGS. 4 and 6) are actuated so that a shifting towards the left in FIG. 4 of piston rods 37 is caused for shifting in the same direction the elements, grasping among them a portion of each fabric piece which has to be conveyed. Thereafter, the fluid-dynamic cylinders 48 which control the closing of the pliers are actuated causing shifting towards the right in FIGS. 4 and 9 of the bar or racks 46 (FIG. 9) for causing the gears of boxes 39 to rotate in such a direction to move the arms of pliers 45 and then close them. Due to the rotation of the upper gears of each pair of gears 44, bar 52 (FIG. 6) is rotated which drives into rotation upper gears 50 (FIG. 10) of boxes 49 arranged between boxes 39. The rotation of one of gears 50 of the pair rotates the other one too, thus causing the pliers of the boxes to close simultaneously with the closing of those of the other boxes. Thereafter fluid-dynamic cylinder 33 (FIG. 4) is actuated, which controls the movement of carriage 29 so that the translation of the latter into its travel end position towards the right in FIG. 4 is defined.

During such movement the pliers drag the corresponding fabric piece which can therefore be arranged above bands 53 of both conveyors 4 and 5. At the end of the shifting, first the fluid-dynamic cylinders 48 are again actuated, so that due to the translation of racks 46 bars (FIG. 9) in a direction opposite to the previous one, the opening of pliers and then the fluid-dynamic cylinders 38 are controlled for defining the shifting towards the right of piston rods 37 with respect to tubular elements 36 so that each fabric piece of the relative pliers is made completely free.

When motors 55 (FIG. 2) which control the motion of bands 53 of conveyors 4 and 5 are actuated, each fabric piece is conveyed by the bands towards the corresponding joining device 6, 7.

Each joining device, at the beginning of its operation cycle is in the position shown in FIG. 7 in which oscillating plate 60 is rotated counter-clockwise in its lowered position, as shown in the figure. Let us suppose that on fixed plate 61 there is lying the end portion of another fabric piece which has been already joined in a previous operation cycle of the device, and then dragged into the position by conveyors 86. In that position when the cycle of the joining device begins, frame 76 is in its position as shown in the figure, that is, completely rotated in the clockwise direction, so that stopping fin 81 of slide 78 is positioned lower than the end edge of the fabric piece lying on the fixed plate 61.

Figure 8:
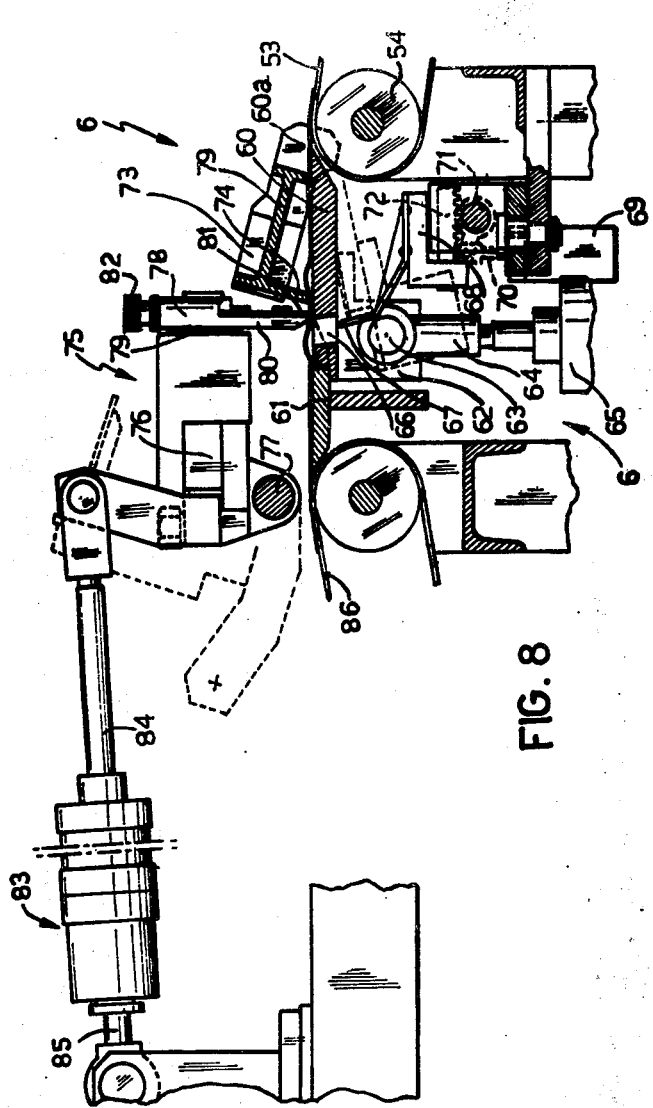
FIG. 8 shows a view similar to the one of the previous figure of said joining device, in a second operative position thereof.
Figure 11:
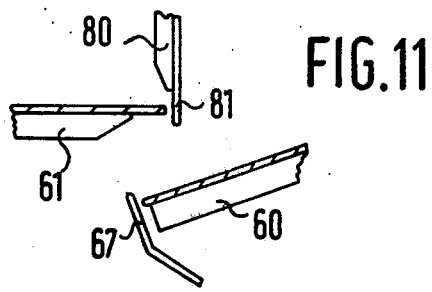
FIGS. 11 to 14 show, schematically, successive steps of the process according to the invention.
Figure 12:
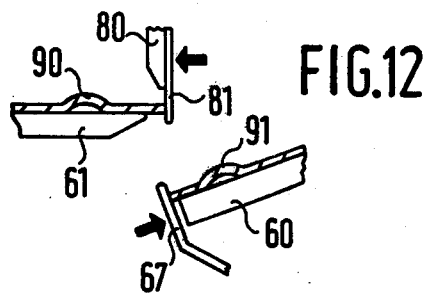

When a fabric piece to be joined is pulled by bands 53, it is arranged partially above mobile plate 60, as shown in FIG. 7, until its fore edge is arranged in immediate proximity of fins 67. As soon as such edge reaches this position, photocell devices 89 (FIG. 2) control such position and consequently they deactuate motors 55, thus stopping bands 53 movement. In such an operative position, on plate 60 (FIG. 7) there lies a fabric piece whose fore edge is at a small distance from fins 67 (FIGS. 7 and 11), while on fixed plate 61 there lies the end portion of the band obtained from already joined fabric pieces and whose rear edge is only a small distance from stopping fin 81. The relative positions of the piece and the band edges are clearly shown in FIG. 11. Now a cycle of the joining device can be started, which occurs in the following manner:

First, fluid-dynamic cylinder 69 is actuated which causes handle 71 (FIG. 8) to rotate and then the shifting towards the right in FIG. 8 of rack 72, which, in turn, shifts frame 68 in the same direction. Therefore, fins 67 are shifted towards mobile plate 60, coming first in contact with the fore edge of the fabric piece lying on it, and then shifting the edge so that the formation of a small wave 91 (FIG. 12) is caused. Simultaneously, the fluid-dynamic cylinder which is on frame 76 can be activated, for controlling the shifting towards the left in FIG. 7, of piston rod 79 with the consequence that stopping fin 81 is shifted in the same direction and it comes first into contact with the rear edge of the fabric piece already joined and lying on fixed plate 61 and then forms a wave 90 (FIG. 12).

Figure 13:
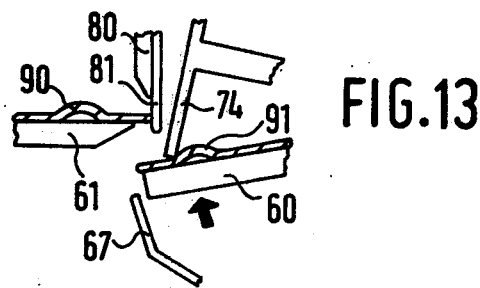

Now fluid-dynamic cylinder 65 (FIG. 7) is actuated which controls the rotation clockwise of oscillating plate 60 which is then shifted upwards as is clearly shown in FIG. 13. After a small rotation of such plate, the fabric piece lying on it comes into contact with thrust element 74 which is therefore dragged together with the plate while a certain pressure is brought to bear on the fabric piece due to elastic reactions given rise to by elastic means of oscillating frame 73.

Therefore, during the rotation of oscillating plate 60, the fore edge of the fabric piece lying on it is kept in the correct initial position even though during the rotation the edge disengages from fins 67 as clearly shown in FIG. 13. In fact, the thrust element 74 locks the fore portion of the piece with respect to oscillating plate 60 thus hindering whatever shifting of its edge.

Figure 14:
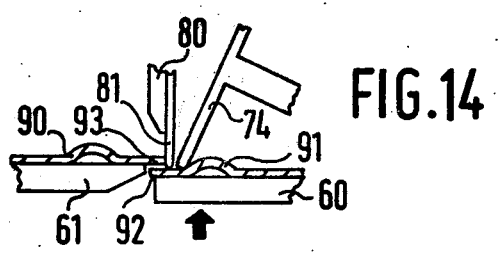

In the last portion of the rotation of plate 60, the upper surface of the fabric piece comes into contact with stopping fin 81 (FIGS. 8 and 14) causing it to shift upwards opposing the elastic force given rise to by the elastic member arranged in the interior of slide member 78.

At the end of the rotation of oscillating plate 60, its upper surface is substantially aligned with the upper surface of plate 61 as shown in FIG. 8. In such configuration, a portion 92 (FIG. 14) of the pre-set length of fabric piece is below a portion 93 of the band lying on fixed plate 61. At this point fluid-dynamic cylinder 83 (FIG. 7) is actuated by conveying fluid under pressure into one of the two cylinder chambers (the one on the left side in FIG. 7) so that the cylinder casing is shifted towards the right in FIG. 7 for controlling the rotation clockwise of frame 76 and therefore the lowering of slide member 78. The consequence thereof is that tool 80 is brought into contact with overlapped portions 92 and 93 (FIGS. 14 and 8) bringing to bear on them a high pressure to join the portions together.

Thereafter, fluid-dynamic cylinder 83 is again actuated by conveying actuation fluid into the other of the two chambers for causing piston rod 84 to translate towards the left in FIG. 7 and, therefore, the rotation of frame 76 so that it is brought into the position shown with a broken line in FIG. 8 to allow photocell 89 to intercept both the tail and the head of the fabric piece coming out of and the one going into the joining area. Oscillating plate 60 is brought again into its lowered position and therefore the just joined fabric piece is absolutely free of getting pulled towards the left by conveyor 86 due to the actuation of relative motor 87.

Although the invention has been described in detail for the purpose of illustration it is to be understood that variations can be made by those skilled in the art without departing from the spirit and scope of the invention except as it may be limited by the claims.

What is claimed is:

1. An apparatus used for tire manufacture for successively joining the overlapping rear end of a deformable material band, obtained by joining together a number of pieces of said material, and the fore end of pieces of the same deformable material comprising:

at least one fixed supporting surface adapted to receive an end portion of said band; means for advancing said band on the fixed supporting surface; means for stopping advancement of said band when the rear edge of the band slightly protrudes beyond an adjacent corresponding edge of said fixed supporting surface; a mobile plate adapted to successively receive each one of said pieces to be joined to said band; a first conveyor constrained between extremity rollers for advancing each piece on said plate; means for stopping the advancement of a piece on said mobile plate when its fore edge is substantially in coincidence with the relative adjacent edge of said mobile plate, the initial relative position of said mobile plate to the fixed supporting surface being such that said edge of said plate is substantially below said edge of said fixed supporting surface; means for rotating said mobile plate about an axis substantially parallel to the axis of said first conveyor rollers towards the fixed surface to bring the fore edge of said piece lying on it below said protruding portion of said band for overlapping said piece fore edge and said band protruding portion; and, means comprising a mobile tool which is brought into contact with said protruding portions for pressing said overlapping piece fore edge and said band protruding portion, said apparatus further comprising:

a pair of thrust elements, each one of said thrust elements being respectively axially shiftable with respect to said fixed supporting surface and to said mobile plate and adapted to come into contact with a respectively associated band rear protruding edge and deformable piece fore edge for shifting said band rear protruding edge and deformable piece fore edge towards the relative adjacent edge of the corresponding fixed supporting surface and plate a pre-set distance and for forming in both band and piece an abundance wave, a first thrust element of said pair of thrust elements comprising a number of protruding elements which are fixed on a mobile frame each one of which is adapted to pass through a corresponding perforation provided near a fore edge of said mobile plate; fluid dynamic cylinders for controlling the relative movement between said plate and mobile frame such that said mobile frame with the protruding elements is shifted towards the mobile plate to cause the protruding elements to come in contact with the fore edge of the piece lying on the plate and shift the piece fore edge so that the formation of an abundance wave is caused in the piece, said means for rotating causing said mobile plate to be rotated after said abundance wave is caused; a pressure element; and, an elastic member for pushing said pressure element towards said plate where it contacts said piece and applies pressure thereto during the rotation of said plate by said means for rotating, said pressure element holding the shifted fore edge of said piece with respect to said plate edge during the rotation of the plate as the edge of the piece disengages from said protruding elements due to plate rotation.

2. An apparatus according to claim 1 further comprising a magazine for storage of said fabric pieces wherein said pieces are arranged in an orderly configuration, a second conveyor suitable to successively convey pieces spaced from each other by a pre-set distance from a charging station to said magazine, and a transferring device adapted to transfer successively a number of pieces from said magazine to said first conveyor for making each piece advance on said plate.

3. An apparatus according to claim 2 characterized in that said first and second conveyors are continuous band conveyors arranged so the shifting direction of the bands of said first conveyor are substantially perpendicular to the shifting direction of the bands of said second conveyor.

4. An apparatus according to claim 2 characterized in that said transferring device comprises at least one set of pliers provided with closing and opening means, each one of which is adapted to grasp a portion of an edge of said piece, said pliers being fixed to a mobile carriage movable from a first position in which said pliers are closed to a second position in which said pliers are opened.

5. An apparatus according to claim 4 characterized in that said pliers set is axially mobile with respect to said carriage, means being provided for successively controlling: the shifting of said pliers set with respect to said carriage in a first direction towards the piece to be transferred, the closing of said pliers, the shifting of said carriage for removing the piece from said magazine, the opening of said pliers and the shifting of said pliers set with respect to said carriage in a second direction opposite the first.

6. An apparatus according to claim 4 characterized in that at least some of said pliers are connected with a first tubular element telescopically mobile in a second tubular element connected with said carriage wherein in the interior of said first tubular element slides a bar suitable to control the opening and the closing of said pliers and said movements of said first tubular element and of said bar are carried out by means of fluid-dynamic cylinders.

7. An equipment according to claim 6 characterized in that at least one pliers unit comprises two pliers arms, each one of which is connected with a gear, where each of said gears is coupled with a rack which, in turn, is connected with said bar.

8. An apparatus according to claim 1 characterized in that said means for making said band advance on the supporting fixed surface comprises a third continuous band conveyor.

9. An apparatus according to claim 2 characterized in that said magazine comprises at least one supporting plate for said pieces where said supporting plate is provided with a number of perforations through which piece dragging rollers protrude which are driven into rotation and whose external surfaces are smooth and adapted to come into contact with the lower surface of a piece, and dragging rollers are arranged on the edge of said supporting plate facing said transferring device which are rotated and on whose external surface there are helicoidal projections adapted to come into contct with said piece lower surface.

10. An apparatus according to claim 9 characterized in that said magazine comprises at least two of said supporting plates arranged at different heights one above the other and further comprising a deviating gear arranged between said second conveyor and said magazine for alternately guiding a fabric piece onto the higher supporting plate or onto the lower supporting plate.

11. An apparatus according to claim 1 characterized in that said mobile tool is carried by an oscillating frame whose rotation is controlled by a fluid-dynamic cylinder.

12. An apparatus according to claim 1 characterized in that the second thrust element of said thrust elements is connected to said mobile tool, the latter being axially mobile with respect to said oscillating frame for shifting the rear edge of said band, where the axial shifting of said tool with respect to the oscillating frame is controlled by a fluid-dynamic cylinder which is carried by said frame.

13. An apparatus according to claim 1 characterized in that said second thrust element comprises a member elastically mobile with respect to said mobile tool.

14. An apparatus according to claim 1 characterized in that said first conveyor for advancing said piece on said mobile plate is adapted to be deactivated for stopping said advancement when the fore edge of said piece protrudes by a pre-set quantity with respect to the corresponding edge of said mobile plate.

* * * * *